Figure 1:
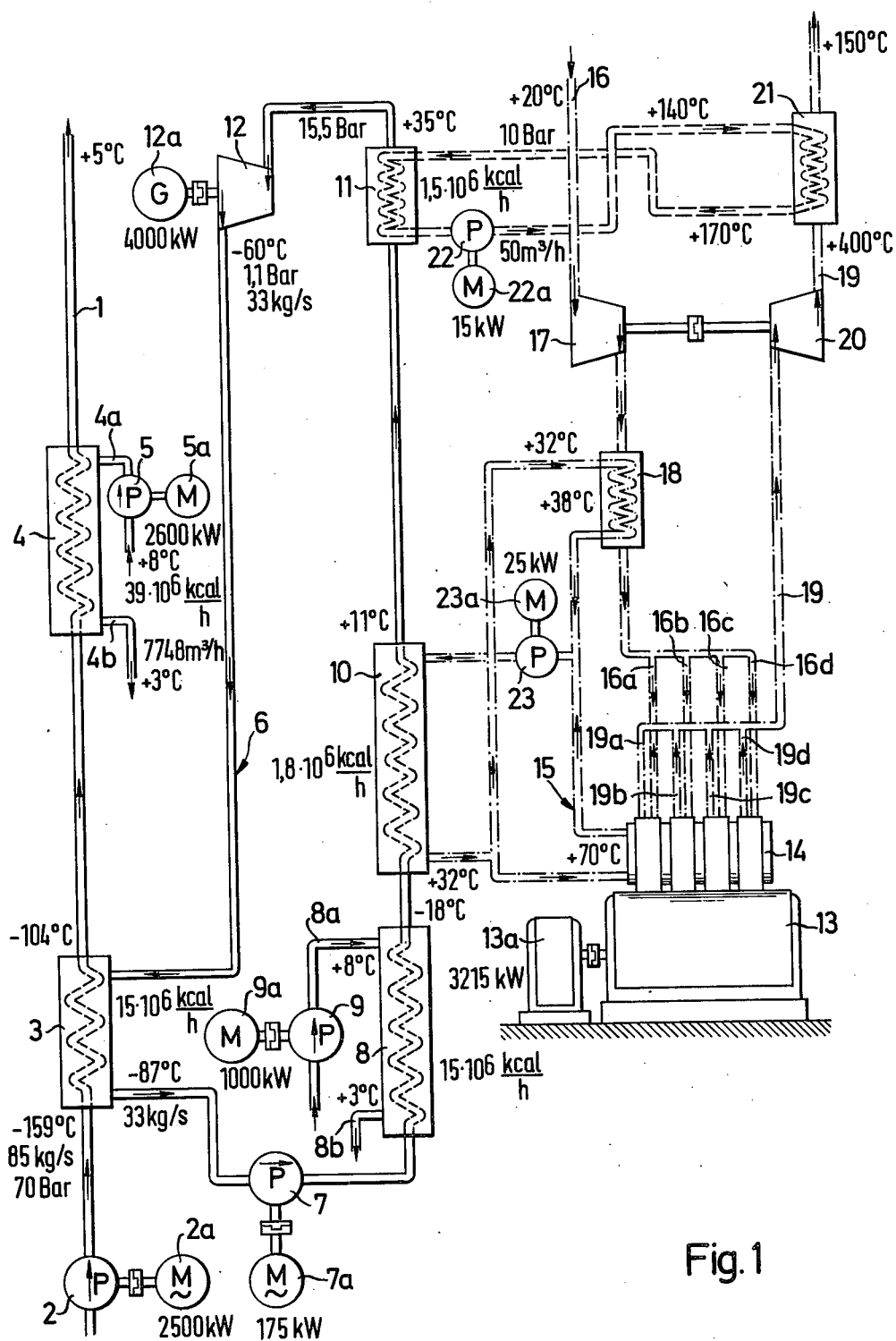

United States Patent [19]

Mandrin

[11] 4,033,135
[45] July 5, 1977

[54] PLANT AND PROCESS FOR VAPORIZING AND HEATING LIQUID NATURAL GAS

[75] Inventor: Charles Mandrin, Winterthur, Switzerland

[73] Assignee: Sulzer Brothers Limited, Winterthur, Switzerland

[22] Filed: Jan. 29, 1976

[21] Appl. No.: 653,594

[30] Foreign Application Priority Data

Feb. 7, 1975 Switzerland .................. 8943/75
July 9, 1975 Switzerland .................. 8943/75

[52] U.S. Cl. .................. 60/648; 60/655; 60/618; 62/52; 62/238; 62/438
[51] Int. Cl.² .................. F01K 23/10
[58] Field of Search .......... 60/648, 651, 655, 671, 60/616, 617, 618; 62/52, 238, 438

[56] References Cited

UNITED STATES PATENTS

| | | | |
|---|---|---|---|
| 3,154,928 | 11/1964 | Harmens | 60/671 X |
| 3,183,666 | 5/1965 | Jackson | 60/648 X |
| 3,293,850 | 12/1966 | Morrison | 60/648 |
| 3,830,062 | 8/1974 | Morgan et al. | 60/651 X |
| 3,892,103 | 7/1975 | Antonelli | 60/648 X |

Primary Examiner—Allen M. Ostrager
Attorney, Agent, or Firm—Kenyon & Kenyon Reilly Carr & Chapin

[57] ABSTRACT

The plant obtains heat energy from a diesel engine plant in order to vaporize a flow of liquid natural gas. The obtained heat is conducted via a circuit containing a hydrocarbon heating agent to the liquid natural gas pipeline. In one embodiment, heat energy is also obtained from a further heat source such as sea water to heat the liquid natural gas. In another embodiment, a part of the heat energy obtained from the diesel engine plant is used directly to heat the liquid natural gas.

12 Claims, 2 Drawing Figures

PLANT AND PROCESS FOR VAPORIZING AND HEATING LIQUID NATURAL GAS

This invention relates to a plant and process for vaporizing and heating liquid natural gas.

As in known, natural gas is usually found in a gaseous state but is generally liquified in order to be transported or to be stored. When used, however, the liquid natural gas has usually been vaporized by adding heat in order to restore the gas to a natural gaseous state. Various types of plants and processes have been known for effecting this purpose. For example, use has been made of a heat exchanger to supply heat to the liquid natural gas at the destination of the gas in order to vaporize and heat the gas to substantially ambient temperature. The normal heating agents used have been, for example, sea water, river water or air.

In one known process, the natural gas is vaporized and heated by heat exchange with a number of heating agents, namely sea water and a second heating agent, such as methane or propane. In the case of the second heating agent, the agent has been confined to flow in a circuit in which the agent is condensed by heat exchange with the liquid natural gas and then, after being brought to the necessary pressure by a pump, is vaporized by heat exchange with sea water and expanded in a turbine to perform work. A process of this kind, however, has considerable disadvantages as will be shown hereinafter.

For instance, the temperature of sea water does not remain constant throughout the year, so that there can be no guarantee, least of all in northern zones, that the vaporized natural gas will have the required temperature above the freezing point of water.

Another very considerable disadvantage is that the electric power required to drive the sea water and natural gas pumps and the rest of the electric power required by the plant, for instance, the drives of boil-off compressors, electric control installations, the electrical measurement of safety devices, etc., cannot be provided by the turbine output in the circuit of the second heating agent. The electricity requirements of a thermal plant of the kind specified therefore depend on the mains, whose current has of course been produced by power stations of relatively low efficiency — for instance, a steam power station has an efficiency of about 40 %.

Accordingly, it is an object of the invention to provide a process and the plant for the vaporization and heating of natural gas which enables the plant's electricity requirements to be covered independently of the mains and with an efficiency which is a substantial improvement on conventional power stations.

Briefly, the invention provides a plant and a process for vaporizing and heating liquid natural gas (LNG) in which heat energy is obtained at least in part from a diesel engine plant.

The plant for vaporizing and heating the liquid natural gas hereinafter (LNG) includes a means which defines a predetermined flow path for a flow of LNG, a means in the flow path of the LNG to place the flow in heat exchange relation with a first heating agent, a circuit for a second heating agent and a diesel engine plant. The circuit for the second heating agent includes at least one heat exchanger for placing the second heating agent in heat exchange relation with the flow of LNG, a pump for pumping the heating agent through the circuit, at least one secondary heat exchanger for heating of the agent and a turbine for expansion of the heated agent to perform work. The diesel engine plant includes an air intake means, an exhaust gas outlet means, and a coolant circuit for passing a coolant through the diesel engine plant. At least one of the air intake means, outlet means and coolant circuit of the diesel engine plant is connected to the secondary heat exchanger of the second heating agent circuit in heat exchange relation for heating of the heating agent.

The air intake means, exhaust gas outlet means and coolant circuit of the diesel engine plant each provides a heatloss source, i.e. a place where heat energy can be obtained from the diesel engine plant.

In one embodiment, the first heating agent can be, for instance, sea water, and if necessary river water on air.

In another embodiment, the first heating agents flows in a circuit and is re-heated by at least one of the heatloss sources of the diesel engine plant. In that case, the process is completely independent of any outside heating source such as, for instance, sea water or atmospheric air. To this end, at least one heat exchanger through which vaporized natural gas flows is disposed in the circuit of the first heating agent, such circuit also being connected to a heat loss source of the diesel engine plant.

In still another embodiment, the heated cooling water of the diesel engine can be the first heating agent with heat being transmitted to the vaporized natural gas from at least a proportion of the heated cooling water. Advantageously, heat can be transmitted to the second heating agent from the other proportion of the heated cooling water of the diesel engine.

The process of the invention comprises the steps of passing a flow of LNG through a predetermined flow path; obtaining heat energy from a first heating agent and heating the flow of LNG with the obtained heat; passing a second heating agent through a circuit wherein the second heating agent is condensed during heat exchange with the flow of LNG, thereafter vaporized, heated and expanded to perform work; and obtaining heat energy from an operating diesel engine plant to heat and vaporize the second heating agent in the circuit.

The second heating agent can advantageously be a hydrocarbon, for instance, ethane, mixtures of hydrocarbons or halogen-substituted hydrocarbons, the latter term meaning hydrocarbons consisting of the radical $CH_3$ and a halogen, such as fluorine, bromine or chlorine.

The essential advantage of the invention is that the efficiency of the thermal plant can be substantially improved by providing a diesel engine plant independent of the mains and using its heat loss sources for the vaporization and heating of the natural gas.

Another feature is that a diesel engine consumes substantially less fuel than, for instance, a gas turbine. Also, a diesel engine can use "poorer" and therefore cheaper fuel, "poor" meaning that there is no objection, particularly to, higher viscosity, higher sulphur content and higher vandaium content.

Moreover, at least part of the output of a generator of the diesel engine generator can be used to drive the ancillary machines, particularly the pumps in the flow path of the natural gas and the first heating agent, so that the drives of these ancillary machines are independent of the mains. The drives of the ancillary machines call for considerable outputs. On the one hand, the natural gas pumps require a high output since, as a rule, natural gas must be brought to a pressure of the order of magnitude of about 70 bars to achieve the optimum design of the natural gas distributing network. On the other hand, the pumps for the first heating agent require a high output, particularly due to the considerable sea water deliveries and necessary delivery heads.

Figure 2:
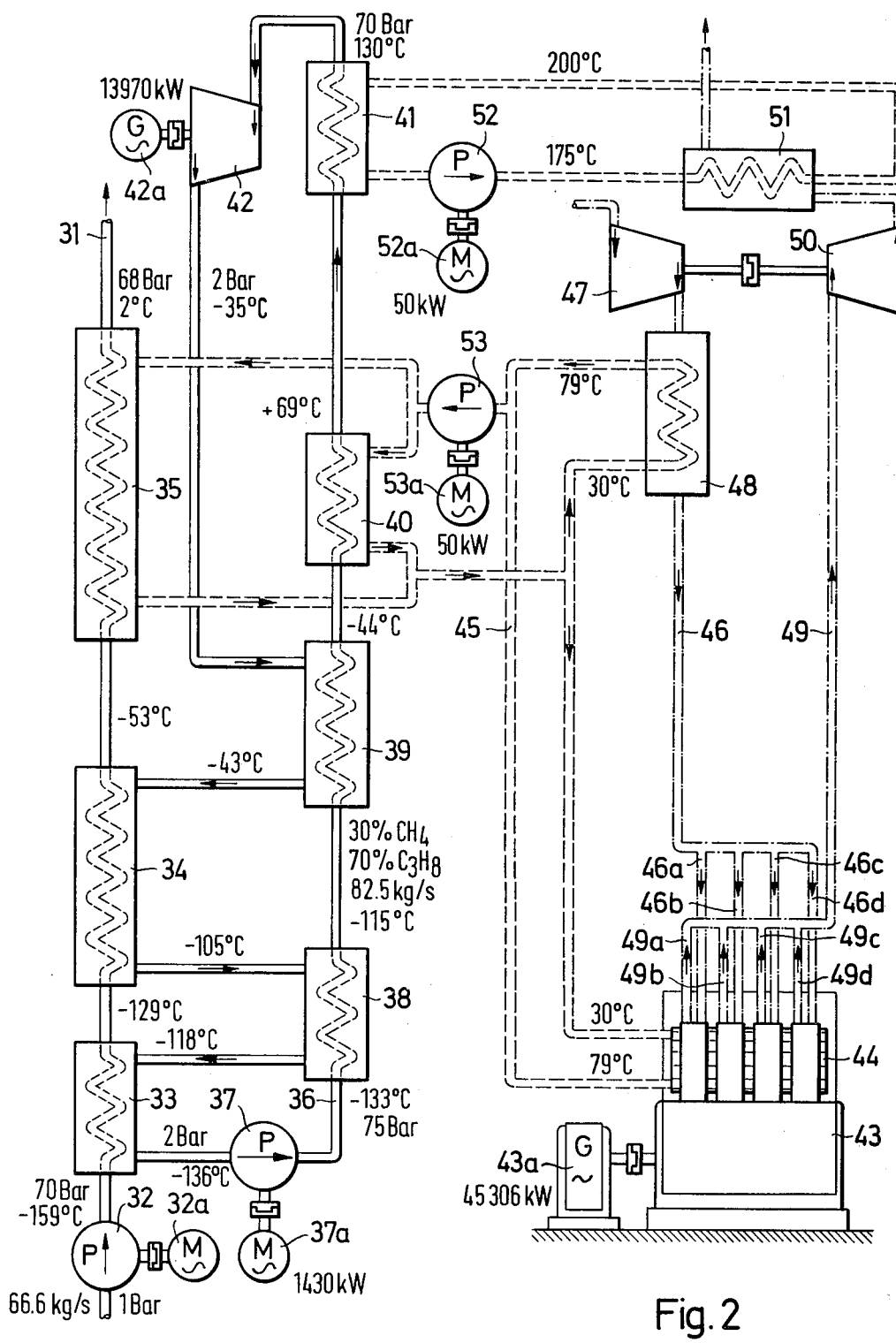

These and other objects and advantages of the invention will become more apparent from the following detailed description and appended claims taken in conjunction with the accompanying drawings in which:

FIG. 1 illustrates a flow diagram of a plant according to the invention using an outside first heating agent, particularly seat water; and FIG. 2 illustrates a modified plant according to the invention in which a first heating agent flows in a circuit which is also connected to a heat loss source of a diesel engine plant.

Referring to FIG. 1, the vaporization and heating plant through which natural gas flows has a means such as a pipeline 1 by which liquid natural gas (LNG) from a natural gas reservoir (not shown) is brought to the required pressure by a pump 2 driven by an electric motor 2a and sent through heat exchangers 3, 4. One heat exchanger 4 is connected via connecting lines 4a, 4b with a first heating agent, i.e. sea water, so as to place the LNG in heat exchange with the sea water, so as to place the LNG in heat exchange with the sea water. A delivery pump 5 having an electric drive motor 5a is disposed in the line 4a in order to pump the heating agent through the heat exchanger 4. The other heat exchanger 3 forms part of a circuit 6 for a second heating agent, for instance, ethane and serves to place the heating agent in heat exchange relation with the flow of LNG. The circuit 6 also includes a pump 7 driven by an electric motor 7a for pumping the agent through the circuit, at least one secondary heat exchanger, e.g. three, 8, 10, 11 for heating of the agent and a turbine 12 for expansion of the heated agent to perform work. As shown, the circuit 6 also has a generator 12a driven by the turbine 12.

The diesel plant includes a diesel engine 13 which drives a generator 13a, an air intake means for delivering air for combustion via a supply line 16, charging compressor 17 and branch lines 16a — 16d, an exhaust gas outlet means in the form of a line 19 which connects to the cylinders of the diesel engine 13 via branch lines 19a – 19d for the removal of exhaust gases, and a coolant circuit for passing a coolant through the engine 13. This coolant circuit includes a jacket cooling device 14 to which connecting lines 15 are connected to circulate water therethrough. In addition, a heat exchanger 18 is located in the flow path of the coolant and the combustion air to effect a heat exchange therebetween. Similarly, an expansion turbine 20 is disposed in the flow path of the exhaust gas to drive the charging compressor 17, and a heat exchanger 21 is disposed downstream of the turbine 20 to effect a heat exchange between the exhaust gas and a heat-transfer medium, for instance, water. This heat-transfer medium flows in a circuit through the heat exchanger 21 and the heat exchanger 11 under the influence of a pump 22 driven by an electric motor 22a. If necessary, the circuit can be eliminated, in which case the exhaust gases are brought into heat exchange with the second heating agent directly in the heat exchanger 11.

The heat exchanger 10 and a pump 23 driven by an electric motor 23 a are connected in the cooling water circuit 15.

The operation of the plant will now be described.

After being brought to an elevated pressure by the pump 2, liquid natural gas from a natural gas reservoir (not shown) is evaporated in the heat exchanger 3 by heat exchange with the second heating agent, the latter being condensed. The evaporated natural gas is further heated in the heat exchanger 4 by heat exchange with the first heating agent and introduced via the pipeline 1 into a distributing network (not shown).

The second heating agent which is condensed in the heat exchanger 3 is heated in the heat exchanger 8 by heat exchange with the first heating agent, i.e. sea water, which is introduced by a pump 9 driven by an electric motor 9a via line 8a into heat exchanger 8 and removed therefrom via lines 8b. In the secondary heat exchanger 10, the second heating agent is evaporated and, in the secondary heat exchanger 11, the agent is superheated by heat exchange with the cooling water heated in the jacket-cooling device 14 and by heat exchange with the circulating heat-exchange medium which has been heated by heat exchange with the hot exhaust gases in the heat exchanger 21. The second heating agent is then expanded in the turbine 12 and flows back to the heat exchanger 3.

If necessary, the heat exchanger 8 can be eliminated, so that the second heating agent is heated, vaporized and superheated in heat exchangers 10, 11.

As mentioned above, the heat content of the cooling water, air for combustion and exhaust gases represent the heat loss sources of the diesel engine plant used to heat and vaporize the second heating agent.

The plant is so constructed that the electric power supplied by the diesel engine generator 13a and the turbine generator 12a of the second heating agent circuit is adequate to cover the power requirements of the pumps incorporated in the plant as well as those of any other devices in the plant which are not shown such as, for instance, electric control systems, drives of boil-off compressors, etc.

FIG. 1 shows numerical values, calculated for the plant, of a number of values of decisive importance for the efficiency of the plant and process. The efficiency of the plant as calculated from these values is of the order of 85%. Calculation of the efficiency of the thermal plant illustrated, with reference to the values shown in FIG. 1:

| Specific Electrical Requirements: | |
| --- | --- |
| Drive power for natural gas pump: | 2 500 kW |
| Drive power for sea water pumps: | 3 600 kW |
| Other electric loads: | 900 kW |
| | 7 000 kW |
| Power Produced in the Plant: | |
| Terminal power of diesel generator: | 3 215 kW |
| Ethane turbine generator: | 4 000 kW |
| | 7 215 kW |
| minus drive power of ethane and hot water pumps: | – 215 kW |
| The required fuel consumption for a diesel engine with an efficiency of 39% corresponds to a thermal power of: | 8 240 kW |

$$\text{Efficiency} = \frac{7\ 000}{8\ 240} = 0.85$$

The calculation is based on the assumption that the specific electric power requirements of the plant comprise the power required for driving the natural gas and sea water pumps and the other loads, such as electric control and safety systems and the like used in a plant of the kind specified — i.e., specific electric power requirements which always exist, independently of the electric power for driving the pumps in the ethane and water circuits. The drive power required for the aforementioned pumps is accordingly substracted from the electric power produced in the plant.

Referring to FIG. 2, the plant may be modified so as to utilize the coolant of the diesel engine plant as the first heating agent. As shown, the natural gas flows in a pipeline 31 from a natural gas reservoir (not shown) and is brought to the required pressure by a pump 32 driven by an electric motor 32a and delivered through heat exchangers 33 – 35.

The circuit 36 of the second heating agent, for instance, a mixture of methane and propane, is connected to the heat exchanger 33. The circuit 36 also has a pump 37 driven by an electric motor 37a, heat exchangers 38 – 41, a turbine 42 driving a generator 42a, and a heat exchanger 34.

The diesel engine plant includes a diesel engine 43 which drives a generator 43a, a jacket-cooling device 44 to which connecting lines of a cooling water circuit 45 are connected, a supply line 46 which branches into connecting lines 46a – 46d for the air for combustion with a charging compressor 47, a heat exchanger 48 through which cooling water flows, and a line 49 for removing the exhaust gases which is connected via branch lines 49a – 49d to the cylinders of the diesel engine. In addition, an expansion turbine 50 drives a charging compressor 47, and a heat exchanger 51, through which a heat-transfer medium, for instance, water, flows, is disposed in the flow path of the exhaust gases.

The heat-transfer medium flows in a circuit through the heat exchanger 51 and heat exchanger 41, the medium being delivered by a pump 52. If necessary, the exhaust gases can be brought into heat exchange with the second heating agent directly in the heat exchanger 41.

Heat exchangers 35, 40 and 48 and a pump 53 driven by a motor 53a are also incorporated in the cooling water circuit 45 which is connected to the cooling water system 44 of the diesel engine 43.

The operation of the plant will now be described.

After being brought to an elevated pressure by the pump 32, liquid natural gas from a natural gas reservoir (not shown) is heated in the heat exchanger 33 by heat exchange with the second heating agent, for instance, a mixture of methane and propane. The natural gas is heated in the heat exchanger 34 by heat exchange with the second heating agent, further heated in the heat exchanger 35 by heat exchange with the first heating agent — i.e., heated cooling water of the diesel engine — and introduced via the line 31 into a distributing network (not shown).

The second heating agent which is cooled in the heat exchanger 33 is heated in the heat exchangers 38 and 39 by heat exchange with the second heating agent expanded in the turbine 42 and by heat exchange with the first heating agent in the heat exchanger 40 and is vaporized and superheated in the heat exchanger 41 by heat exchange with the circulating heat-exchange medium therein which has been heated by heat exchange with the hot exhaust gases in the heat exchanger 51. The second heating agent is then expanded in the turbine 42 and flows back via the heat exchangers 39, 34, 38 and 33.

One proportion of the cooling water heated in the jacket-cooling device 44 passes through the heat exchanger 35 to heat the natural gas, while another proportion flows through the heat exchanger 40 to transfer heat to the second heating agent. The majority of the cooling water cooled in the heat exchangers 35 and 40 is returned to the jacket-cooling device 44, while the remainder flows through the heat exchanger 48 and is heated therein by heat exchange with the air for combution of charging compressor 47. This water is then combined with the cooling water heated in the jacket-cooling device 44 before being introduced into the heat exchanger 35 and 40.

In the embodiment illustrated, therefore, the heat content of the cooling water, the air for combustion and the exhaust gases are the heat loss sources of the diesel engine plant which are used to re-heat the first heating agent and to heat and vaporize the second heating agent. Of course, the diesel installation can also have a number of diesel engines connected in parallel.

As shown, various numerical values are given for the plant operating with a second heating agent formed of a mixture of 30% methane and 70% propane.

What is claimed is:

1. A plant for vaporizing and heating liquid natural gas comprising
   means defining a predetermined flow path for a flow of liquid natural gas;
   means in said flow path to place the flow of liquid natural gas in heat exchange relation with a first heating agent;
   a circuit for a second heating agent including at least one heat exchanger for placing the second heating agent in heat exchange relation with the flow of liquid natural gas, a pump for pumping the second heating agent through said circuit, at least two secondary heat exchangers for heating of the second heating agent, and a turbine for expansion of the heated second heating agent to perform work;
   a diesel engine plant including an air intake means, an exhaust gas outlet means and a coolant circuit for passing a coolant through said diesel engine plant and said air intake means, said coolant circuit being connected to one of said secondary heat exchangers of said second heating agent circuit in heat exchange relation with the second heating agent for heating of the second heating agent and said exhaust gas outlet means being connected with the other of said secondary heat exchangers in heat exchange relation with the second heating agent for heating of the second heating agent.

2. A plant as set forth in claim 1 wherein said means in said flow path is connected to at least one of said air intake means, said outlet means and said coolant circuit in heat exchange relation.

3. A plant as set forth in claim 1 which further includes a heat exchanger in said outlet means and a circuit for passing a heat-exchange medium through said latter heat exchanger to receive heat energy from an exhaust gas flow in said outlet means and through said heat exchanger in said circuit for the second heating agent to transfer heat energy to the flow of liquid natural gas.

4. A plant as set forth in claim 1 wherein said diesel engine plant includes a generator for producing an electrical output, said generator being connected at least to said pump to drive said pump.

5. A plant as set forth in claim 1 wherein said circuit for the third heating agent includes a second heat exchanger downstream of said turbine for passing the expanded heating agent in heat exchange relation with the flow of heating agent upstream of said turbine.

6. A process for vaporizing and heating liquid natural gas comprising the steps of passing a flow of liquid natural gas through a predetermined flow path;

obtaining heat energy from a first heating agent and heating said flow of liquid natural gas with the obtained heat;

passing a second heating agent through a circuit wherein said second heating agent is condensed during heat exchange with said flow of liquid natural gas, thereafter vaporized, heated and expanded to perform work; and obtaining heat energy from an operating diesel engine plant to heat and vaporize said second heating agent in said circuit, said latter step including the extraction of heat from a flow of compressed air delivered to the diesel engine plant, from a coolant circulated through the diesel engine plant and from a flow of hot exhaust gas exhausted from the diesel engine plant.

7. A process as set forth in claim 6 which further includes the step of passing the first heating agent in heat exchange relation to the diesel engine plant to heat the first heating agent prior to obtaining heat therefrom for said flow of liquid natural gas.

8. A process as set forth in claim 7 wherein the diesel engine plant includes a coolant circuit for passing water through the plant to cool the plant and wherein at least part of the water is said first heating agent.

9. A process as set forth in claim 6 wherein the diesel engine plant includes a coolant circuit for passing water through the plant to cool the plant and in heat exchange relation to said second heating agent to heat said second heating agent.

10. A process as set forth in claim 6 wherein said second heating agent is a hydrocarbon selected from the group consisting of ethane and a mixture of methane and propane.

11. A process as set forth in claim 6 wherein said second heating agent is a halogen-substituted hydrocarbon.

12. A plant for vaporizing and heating liquid natural gas comprising a pipeline for a flow of liquid natural gas;

a heat exchanger in said pipeline for passing a first heating agent in heat exchange relation to the liquid natural gas;

a closed circuit for a second heating agent, said circuit including at least one heat exchanger in said pipeline for passing the second heating agent in heat exchange relation to the liquid natural gas and at least two secondary heat exchangers for heating of the second heating agent; and a diesel engine plant including an air intake means, an exhaust gas outlet means, and a coolant circuit for passing a coolant through said diesel engine plant and said air intake means; said outlet means and said coolant circuit being connected to a respective one of said secondary heat exchangers of said second heating agent circuit in heat exchange relation with the second heating agent for heating of the second heating agent.

* * * * *

UNITED STATES PATENT AND TRADEMARK OFFICE
CERTIFICATE OF CORRECTION

PATENT NO. : 4,033,135
DATED : July 5, 1977
INVENTOR(S) : Charles Mandrin

It is certified that error appears in the above–identified patent and that said Letters Patent are hereby corrected as shown below:

Correct the priority particulars to read as follows:

-- February 7, 1975    Switzerland    1534/75
July 9, 1975    Switzerland    8943/75 --

Column 2, line 18, "agents" should be --agent--.

Column 3, lines 28 to 30, delete "so . . . water".

Column 5, line 7, change "substracted" to --subtracted--.

Column 6, line 15, "exchanger" should be --exchangers--.

Column 7, line 4, "third" should be --second--; and "second" should be --third--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks